United States Patent [19]

Katayama et al.

[11] 4,391,835

[45] Jul. 5, 1983

[54] METHOD FOR MAKING SIMULATED TOFU PRODUCTS

[75] Inventors: Tsutomu Katayama, Izumisano; Toyohiko Nakanishi, Nanao, both of Japan

[73] Assignee: Fuji Oil Company, Limited, Osaka, Japan

[21] Appl. No.: 225,320

[22] Filed: Jan. 15, 1981

[30] Foreign Application Priority Data

Feb. 1, 1979 [JP] Japan .................. 54-11054

[51] Int. Cl.³ .................. A23J 3/00; A23L 1/325
[52] U.S. Cl. .................. 426/573; 426/574; 426/656; 426/657
[58] Field of Search .............. 426/573, 574, 634, 656, 426/657

[56] References Cited

U.S. PATENT DOCUMENTS

| | | |
|---|---|---|
| 3,812,267 | 5/1974 | Atkinson .................. 426/634 X |
| 3,955,011 | 5/1976 | Niki et al. .................. 426/574 X |
| 4,117,174 | 9/1978 | Tonouchi et al. .................. 426/634 |
| 4,118,517 | 10/1978 | Niki et al. .................. 426/574 X |
| 4,173,657 | 11/1979 | Gaudio et al. .................. 426/574 |
| 4,176,202 | 11/1979 | Decker et al. .................. 426/574 |
| 4,181,749 | 1/1980 | Niki et al. .................. 426/574 X |

FOREIGN PATENT DOCUMENTS

| | | | |
|---|---|---|---|
| 54-37846 | 3/1979 | Japan .................. | 426/634 |
| 55-43741 | 7/1980 | Japan .................. | 426/634 |
| 7210618 | 2/1973 | Netherlands .................. | 426/574 |

*Primary Examiner*—Robert A. Yoncoskie
*Attorney, Agent, or Firm*—Wenderoth, Lind & Ponack

[57] ABSTRACT

A method for making a simulated tofu product (soy milk curd) comprising mixing soybean protein and fish protein with water and salt and heating the mixture to cause it to coagulate by heat. The simulated tofu product so made has physical properties much similar to the genuine tofu made by the traditional method.

8 Claims, No Drawings

METHOD FOR MAKING SIMULATED TOFU PRODUCTS

BACKGROUND OF THE INVENTION

The present invention relates to a method for making simulated tofu products.

"Tofu" or possibly a soybean curd in contrast to a soy protein (acid precipitated) curd is one of the most popular, traditional soybean foods in Eastern Asia and is an important source of vegetable protein for people living in this region. It is edible in the form either cooked or not cooked and with or without a seasoning added and is a watery, white, jelly-like fragile food item having a moisture content as high as 88% by weight. In most cases, tofu is prepared by complicated manual processes. In a traditional process long-lasting in Japan, soybeans as a raw material are soaked in water for a prolonged period of time, for example, 8 to 24 hours according to the season, and the soaked soybeans are ground to form a slurry thereof. This slurry is then heated to extract the soy protein in the form as dissolved in liquid phase and subsequently filtered through a coarse cloth to remove insoluble soybean refuse which consists mainly of pulverized cellular substances and is generally known as "Okara" still utilizable for human and animal consumption. The filtrate, that is, soy milk, separated from the okara is subsequently coagulated to form a soy milk curd by the addition of a coagulating agent such as nontoxic alkaline earth metal salt, for example, calcium sulfate, calcium chloride or magnesium chloride. The soy milk curd so prepared is, before being submitted for human consumption, drained to remove the whey by placing it in a box traditionally made of wood and having a weighting lid, thereby completing the tofu.

In recently developed processes, certain organic gamma or delta lactones of aldonic and uronic acids, such as D-glucono-δ-lactone, are used as the coagulating agent and the necessity of the whey draining process has been eliminated. Notwithstanding this improvement, the prior art processes used for making the tofu still require many laborious, time-consuming procedures and generally are not suited for automated mass production line.

Apart from the genuine tofu made by the traditional methods including the recently improved ones, a simulated tofu is also well known and is currently available in the market in the form of a ready-to-cook or instant tofu. This simulated tofu is made by boiling an acqueous solution of powdery soybean protein isolate, adding a coagulating agent while the solution is boiled, and allowing the solution to cool.

A simulated tofu made without the addition of any coagulating agent is also known. For example, the Japanese Patent Publication No. 53-25015, published on July 24, 1978, the invention of which has been assigned to the same assignee of the present invention, discloses the simulated tofu made by uniformly mixing soybean protein isolate with 5 to 8 parts by weight of water and 0 to 4, preferably 0.5 to 2, parts by weight of edible oil, both relative to the total weight of the solids of the soybean protein isolate, and then heating the mixture to allow the latter to be coagulated by heat. The soybean protein isolate used therein is the one manufactured and sold under the trade name "Fujipro-R" by the assignee of the present invention and is specified as of a type having a gelling property so sufficient that a round cake of the soybean protein isolate, 3 mm in thickness and 3.5 cm in diameter, prepared by kneading a mixture of soybean protein isolate with 3.5 parts by weight of water relative to the total weight of the solids of the soybean protein isolate, heating the kneaded mixture in a boiled water for 30 minutes after having been filled in a casing of 3.5 cm in internal diameter, and cutting it to the predetermined dimensions after having been cooled, will neither crack nor break upon bending. In this known method, no coagulating agent is employed, it however involving the following disadvantages.

Physical properties of the simulated tofu product according to the above described known method, specifically, the hardness and the cohesiveness thereof as measured by the use of a testurometer, are similar to those exhibited by the genuine tofu. However, experiences have shown that the simulated tofu so prepared tends to give a sticky touch or sensation when a kitchen knife is passed in to cut it and also when the knife so passed in is being removed, and also to give a heavy sensation to the mouthfeel, those sensations being similar to that given by a "sesame tofu". The "sesame tofu", though it is a sort of simulated tofu, and is one of the traditional food items of Japan, is not a kind of proteinaceous gel made of bean curd but a kind of starchy gel made by heat-coagulating an acqueous mixture of an arrowroot starch with finely devided particles of sesame.

In view of the availability of the sesame tofu, those sensations afforded by the simulated tofu according to the above-mentioned publication are not of a nature unagreeable to consumers. However, we have long conducted a series of experiments to develop a method for making a simulated, ready-to-cook tofu product similar in physical property to that of the genuine tofu, the result of which has now matured to the present invention.

SUMMARY OF THE INVENTION

The present invention is featured in that a predetermined amount of fish protein is mixed with soybean protein prior to the mixture being heat-coagulated, thereby substantially eliminating the sticky and heavy sensations or starchy gel-like mouth feel inherent in the prior art simulated tofu product. According to the present invention, care must be taken in the determination of the quantity of the fish protein relative to the weight of the solids of the soybean protein. If the quantity of the fish protein is relatively large, not only does the resultant simulated tofu product tend to give a mouthfeel similar to that given by "Kamaboko", a boiled or cooked fish cake or paste made of "Surimi", a sort of minced fish, which is an edible flesh of fish separated from bones and skin and converted into a 'universal' food material preservable by freezing, but also the manufacture thereof will become complicated as to the temperature control.

DETAILED DESCRIPTION OF THE EMBODIMENT

The soybean protein employed in the practice of the present invention may be a condensed soy milk, a powdered soy milk or a soybean protein concentrate or soybean protein isolate, (which isolate is a proteinate neutralized of acid-precipitated soy protein curd irrespective of whether or not it is dried). The king and/or amount of the soybean protein to be employed vary depending on the kind and/or amount of the fish protein to be mixed therewith.

The fish protein to be mixed with the soybean protein referred to above may be "Surimi", "Seiniku" or "Otoshi-mi" of any edible fish generally consumed in fishery products. The Japanese term "Otoshi-mi" may be referred to as a 'crushed fish' which is an edible fish product prepared by crushing headed and gutted fish, while the Japanese term "Seiniku" may be referred to as 're-fined fish meat' which is an edible fish product prepared by washing, then dehydrating and finally straining the Otoshi-mi to remove crushed bones and skin that have been contained in the Otoshi-mi.

Furthermore, the mixture of the soybean protein and the fish protein must have a gelling property when heated as will be defined later, but they may not have their own gelling property. Unless the mixture of the soybean and fish proteins as a whole has a gelling property, coagulation by heat will hardly take place during the heating process even in the presence of water and, if not impossible, the resultant product will not only exhibit a hardness comparable to the genuine tofu, but also lack the capability of retaining a water content, that is, the water retention.

Whether or not the mixture of the soybean protein and the fish protein as a whole has the intended gelling property can be determined by preparing a sample in the following manner and testing the sample by bending. If the sample so prepared does neither crack nor break, the mixture is considered as having a sufficient gelling property. The sample referred to above is prepared by kneading the mixture with 3.5 parts by weight of water relative to the total weight of the solids of such mixture with the addition of salt, heating the kneaded mixture for 30 minutes in a boiling water after having been filled in a casing of 3.5 cm in internal diameter, and cutting it to give the sample of 3.5 cm in diameter and 3 mm in thickness after having been cooled.

The ratio of the amount of the fish protein relative to the amount of the soybean protein according to the present invention must be 1/19 to 3, that is, Soybean Protein/Fish Protein=95/5~25/75, based on the part-by-weight of the solids thereof. If the amount of the soybean protein is smaller than the lower limit, the resultant product tends not only to give a fishy flavor lacking a softness as compared with that of the genuine tofu, but also to give a mouthfeel similar to that given by a Kamaboko. In addition, when cooked, the resultant product tends to be excessively packed as compared with that given by the genuine tofu, thereby lacking a similarity to the genuine tofu.

Moreover, in view of the fact the fish protein is easier to set than the soybean protein, that is, the fish protein when in a pasty state is, when allowed to stand, transformed into a gel state with time more readily than the soybean protein, and also in view of the fact that the setting capability of the fish protein varies depending on temperature and/or time, the mixture containing an insufficient amount of the soybean protein requires a strict, but difficulty control of one or both of temperature and time during the processing of the homogenizing to the heating, or no simulated tofu product will result in. For example, the homogenized mixture containing an insufficient amount of the soybean protein when cooled in a refrigerator for a prolonged period of time larger than a predetermined time, tends to result in the simulated tofu product giving an unfavorable taste as compared with that of the genuine tofu and giving a chewy mouthfeel similar to that given by "Kamaboko" of a type prepared by allowing the kneaded paste to stand at 0° to 15° C. for 15 to 25 hours, this Kamaboko being hereinafter referred to as a low temperature setting Kamaboko. Even when allowed to stand in a manner similar to the kneaded paste for "Kamaboko" of a high temperature setting type prepared by allowing it to stand at 30° to 40° C. for 1 to 2 hours, the homogenized mixture containing an insufficient amount of the soybean protein tends to result in the simulated tofu product giving a mouthfeel similar to that given by "Kamaboko".

On the contrary thereto, if the amount of the soybean protein is larger than the upper limit, the resultant simulated tofu product tends to give a heavy sensation to the mouthfeel in a manner similar to that given by the sesame tofu and also to exhibit no effect which would otherwise result from the addition of the fish protein, remarkably departing from physical properties similar to that of the genuine tofu.

The employment of the fish protein according to the present invention is effective to impart the resultant product with a slippery sensation to the mouthfeel similar to that given by the genuine tofu. Where the fish protein is employed in the form of a white flesh fish, the colour of the resultant simulated tofu product can be improved in a manner similar to that given by the use of oil as will be described later.

The mixture of the soybean protein with the fish protein should be prepared by the use of water with or without oil. The amount of the water should be within the range of 5 to 8 parts by weight relative to the total weight of the solids of the protein mixture, and the amount of the oil should be within the range of 0 to 4, preferably 0.3 to 2, parts by weight relative to the total weight of the solids of the protein mixture. A salt should also be contained in the mixture in an amount sufficient to facilitate solubilizing fish protein.

If the amount of the water is smaller than the lower limit, the resultant product obtained subsequent to the heating of the mixture will exhibit a high hardness as compared with that of the genuine tofu and, in the worst case, it may become as hard as Kamaboko or sausage. On the contrary thereto, if the amount of water is larger than the upper limit, the mixture would not coagulate even when heated and, if not impossible, the resultant product lacks not only a water retention but also a hardness comparable to the genuine tofu.

The use of the oil may not be essential. However, the use of the oil is effective to improve both taste and color of the resultant simulated tofu product. If the amount of the oil used is excessive, the resultant product will become oily.

With respect to the use of salt, the fish protein has such a property as to absorb, retain or dissolve in a saline water a water content when added with salt. The salt used in the practice of the present invention may be a table salt, and the amount thereof is about 1.5~4% relative to the weight of a raw fish meat.

The mixture of the soybean protein and the fish protein may contain one or some additives including condiments, and flavoring agents. Those additives may also include powdered beefsteak-plant leaves, powdered lavers, citron, crab meat, simulated crab meat (a sort of Kamaboko having a crab meat flavor), powdered sesame and cheese. The use of one or more additives is effective not only to improve the taste of the resultant simulated tofu product, but also to enable the manufacture of a variety of simulated tofu products of different taste.

In order to prepare the mixture containing the soybean protein, the fish protein, the water and the oil with or without the additives, any suitable and known homogenizing method may be employed. However, it is preferred to prepare an emulsion by mixing the soybean protein, the water and the oil with the use of a cutting machine, and to mix the emulsion with the fish protein while chilled water and salt are added. Alternatively, homogenizing may be carried out by mixing the Surimi with the soybean protein, the water and the oil to give a paste and then kneading the paste with chilled water and salt added at this time. A further preferred homogenizing method is to apply salt to a fish meat and to homogenize while a low concentration emulsion containing the soybean protein, the oil and the water is added to the salt-applied fish meat.

A defoaming agent such as silicone oil or fatty acid monoglyceride may be added to the homogenized mixture. Alternatively, instead of the employment of the defoaming agent, foams or voids may be eliminated by either placing the homogenized mixture in a vacuum or reduced pressure chamber or centrifuging the homogenized mixture.

Where a coagulating agent is employed, care should be taken to avoid any possible solubilization. For this purpose, the pH of the homogenized mixture should be adjusted to 6.6 7.4 by either employing a water-insoluble coagulating agent such as calcium sulfate or employing a water-soluble coagulating agent, such as calcium chloride or magnesium chloride, in combination with a non-toxic alkalifying agent.

Subsequent to the preparation of the homogenized mixture, the latter may or may not be allowed to stand at a temperature lower than 40° C. for a period of time dependent on the temperature and is filled in a vessel which may be an open casing or a vacuum package. Thereafter, the homogenized mixture in the vessel is heated to coagulate.

The heating temperature should be at least not lower than 60° C., preferably 75° to 90° C.

It is to be noted that, if the amount of the solids of the fish protein is larger than that of the soybean protein, a predetermined setting takes place in the homogenized mixture during the period in which it is allowed to stand so that the resultant product can give not only a crisp and short mouthfeel but also a reduced heavy sensation.

However, as hereinbefore discussed, the larger the amount of the fish protein, the more is the mouthfeel, possibly a chewy mouthfeel, similar to that given by the Kamaboko enhanced.

Hereinafter, the present invention will be described by way of examples which are not intended to limit the scope thereof.

EXAMPLE

Simulated tofu products each being of the composition show in Table 1 were prepared by using the commercially available soybean protein, "Fujipro-R", manufactured and sold by the assignee of the present invention and the SA grade non-salted Surimi (SA grade is the highest quality according to the Japanese Food Standards.). Each of these products listed A, B, C, D and E in Table 1 was prepared by filling the homogenized mixture in two rectangular boxes of 200 g capacity, and one of the boxes was heated at 80° C., for 40 minutes immediately after the filling and the other box was heated at 80° C. for 40 minutes after having been allowed to stand at 10~15° C. for a day.

TABLE 1

| PRODUCT | A | B | C | D | E |
|---|---|---|---|---|---|
| Isolated Soybean Protein (Solids) | 100 | 90 | 60 | 40 | 20 |
| Surimi (Solids) | 0 | 10 | 40 | 60 | 80 |
| Composition | | | | | |
| Isolated Soybean Protein Powder | 12.5 P/W | 11.25 P/W | 7.5 P/W | 5.0 P/W | 2.5 P/W |
| Soybean Oil | 7.5 P/W | 7.5 P/W | 7.5 P/W | 7.5 P/W | 7.5 P/W |
| Water | 80 P/W | 76.25 P/W | 65.0 P/W | 57.5 P/W | 50.0 P/W |
| Surimi | 0 | 5.0 P/W | 20.0 P/W | 30.0 P/W | 40.0 P/W |
| Salt | 0 | 0.15 P/W | 0.6 P/W | 0.9 P/W | 1.2 P/W |
| Water | 0 | 0 | 0 | 12.5 P/W | 25 P/W |
| (Total Water content) | 80.9% | 80.6% | 80.8% | 81.8% | 83.3% |

P/W: Parts by Weight

The results of organoleptic tests of these products are tabulated in Table 2.

TABLE 2

| | A | | B | | C | | D | | E | |
|---|---|---|---|---|---|---|---|---|---|---|
| | X | Y | X | Y | X | Y | X | Y | X | Y |
| Heavy Sensation | 2 | 2 | 1 | 1 | 0.5 | 0 | 0.5 | 0 | 0 | −1 |
| Stickiness to Knife | 2 | 2 | 0 | 0 | −1 | −1 | −2 | −1 | −1 | −1 |
| Chewy Mouthfeel | −1 | −1 | 0 | 0 | 1 | 1 | 1 | 1.5 | 1.5 | 2 |
| Crispness | −2 | −2 | −1 | −1 | 0 | 1 | 0 | 1 | 1 | 1 |
| Packing Capability after Cooking | −1 | −1 | −1 | −1 | 0 | 0 | 1 | 1 | 2 | 2 |
| Flavor | −2 (beany) | −2 | −1 | −1 | 0 | 0 | −1 | 1 | −2 (Fishy) | −2 |
| Total of Absolute Values of Given Points | 10 | 10 | 4 | 4 | 2.5 | 3 | 5.5 | 5.5 | 10 | 11 |

Note 1:
X represents the mixture heated immediately after homogenization and Y represents the mixture heated after having allowed to stand for a day.
Note 2:
Evaluation is performed by giving the rating point within the range of −2 to 2 based on the point of 0 given to the properties of commercially available genuine tofu.

From the foregoing, it is clear that, where the amount of the Surimi is relatively large, the heavy sensation or starchy gel-like mouth feel and the stickiness to the kitchen knife are reduced with the improved crispness or clean bite, accompanied by the increased chewy mouthfeel or rubbery and also the increased packing capability or strong muscles after cooking. The products B, C and D are more similar to the genuine tofu than the other products A and E. In each of the products C, D and E, there can be found a difference in quality between the products X and Y which has resulted from the difference in beginning time at which the homogenized mixture was heated. In particular, the product Y in each of the products C, D and E has shown the reduced heavy sensation and also the increased chewy mouthfeel because of the fact that the homogenized mixture has been allowed to stand for a day. Specifically, the tasting test has shown that, while no difference is present in the products B irrespective of whether or not the homogenized mixtures thereof had been allowed to stand for a day, the products C and D are preferred by most panelists when the homogenized mixtures thereof had been allowed to stand for a day.

Although the present invention has been described in connection with the preferred embodiment thereof, it is to be noted that various changes and modifications are apparent to those skilled in the art. Such changes and modifications are to be understood as included within the true scope of the present invention unless they depart from the appended claims.

We claim:

1. A method for making a simulated tofu product which comprises the steps of preparing a mixture consisting essentially of soybean protein, fish protein, water, edible oil and salt, wherein the weight ratio of the amount of the fish protein relative to that of the soybean protein is within the range of 5:95 to 75:25 based on the part-by-weight of the solids thereof, the amount of the water and that of the edible oil are 5 to 8 parts and 0 to 4 parts by weight, respectively, both being relative to one part by weight of the total weight of the solids of the soybean and fish proteins, and wherein the amount of the salt is present in an amount sufficient to solubilize the fish protein; mixing the mixture uniformly; and heating the mixture to temperatures sufficient to coagulate the mixture.

2. A method as claimed in claim 1, wherein the heating is effected at a temperature not lower than 60° C.

3. A method as claimed in claim 2, wherein the soybean protein is an isolated soybean protein.

4. A method as claimed in claim 2 or 3, wherein the fish protein is a Surimi.

5. A method as claimed in claim 1, wherein the quantity of the oil used is within the range of 0.3 to 2 parts by weight.

6. A method as claimed in claim 1, wherein the weight ratio of solids of the fish protein employed is not less than 40 parts by weight relative to the weight of 60 parts of solids of the soybean protein.

7. A method according to claims 2, 1 or 6 wherein the mixture is allowed to stand for 15 to 25 hours at a temperature within the range of 0° to 15° C., prior to the heating step.

8. A method according to claim 7 wherein the mixture is allowed to stand for a day.

* * * * *